United States Patent [19]

Riskin

[11] Patent Number: 4,866,759
[45] Date of Patent: Sep. 12, 1989

[54] PACKET NETWORK TELECOMMUNICATION SYSTEM HAVING ACCESS NODES WITH WORD GUESSING CAPABILITY

[76] Inventor: Bernard N. Riskin, R.D. 2, Box 121E, Lambertville, N.J. 08530

[21] Appl. No.: 126,630

[22] Filed: Nov. 30, 1987

[51] Int. Cl.$^4$ ............................................. H04M 11/00
[52] U.S. Cl. ................................................... 379/97
[58] Field of Search ....................... 379/89, 93, 96–98, 379/113; 382/40

[56] References Cited

U.S. PATENT DOCUMENTS

| | | | |
|---|---|---|---|
| 3,533,069 | 10/1970 | Garry | 382/40 |
| 3,778,553 | 12/1973 | Rackman . | |
| 3,967,273 | 6/1976 | Knowlton . | |
| 4,012,599 | 3/1977 | Meyer . | |
| 4,087,638 | 5/1978 | Hayes et al. . | |
| 4,164,025 | 8/1979 | Dubnowski et al. | 379/89 |
| 4,191,854 | 3/1980 | Coles . | |
| 4,307,266 | 12/1981 | Messina . | |
| 4,426,555 | 1/1984 | Underkoffler . | |
| 4,427,848 | 1/1984 | Tsakanikas . | |
| 4,532,378 | 7/1985 | Nakayama et al. . | |
| 4,577,062 | 3/1986 | Hilleary et al. . | |
| 4,585,908 | 4/1986 | Smith . | |
| 4,608,457 | 8/1980 | Fowler et al. . | |
| 4,608,460 | 8/1986 | Carter et al. . | |
| 4,614,841 | 9/1986 | Babecki et al. | 379/98 |
| 4,633,041 | 12/1986 | Boivie et al. . | |
| 4,649,563 | 3/1987 | Riskin | 379/97 |
| 4,677,659 | 6/1987 | Dargan | 379/97 |
| 4,685,125 | 7/1987 | Zave | 379/96 |
| 4,737,980 | 4/1988 | Curtin et al. | 379/97 |
| 4,757,267 | 7/1988 | Riskin | 379/113 |

FOREIGN PATENT DOCUMENTS

1320895 6/1973 United Kingdom .
1320896 6/1973 United Kingdom .

OTHER PUBLICATIONS

"Can You Say It in Twelve Keys?", Digital Equipment Corporation, 1985.
Digital Techniques for Computer Voice Response: Implementations and Applications, Rabinar and Schafer, IEEE.
Alphabetic Data Entry Via The Touch-Tone Pad: A Comment, Human Factors, 1971, 13(2) 189–190.

Primary Examiner—Gerald Brigance
Assistant Examiner—Richard Hjerpe
Attorney, Agent, or Firm—Richard C. Woodbridge

[57] ABSTRACT

A telecommunication system has the ability to identify words typed out on a DTMF multi-button pad, convert the words into digital format at a telephone access node and transmit that information on a packet transport network to a remote access node where the words are converted into speech and forwarded to the receiver. The sender begins by typing out the letters of the word on the DTMF buttons. As the word is typed out it is compared at an entrance telephone access node to words stored in a word data bank referred to as a word guessing dictionary. The words in the data bank are stored according to length, numeric equivalent and relative frequency. A prompter asks the sender if the identified word is correct. If it is correct, it is converted into ASCII digital format and transmitted by packet transport network to an egress telephone access node near the receiver. A voice synthesizer then converts the ASCII digital information back into speech so that the receiver can listen to the message typed on the DTMF buttons by the sender.

7 Claims, 7 Drawing Sheets

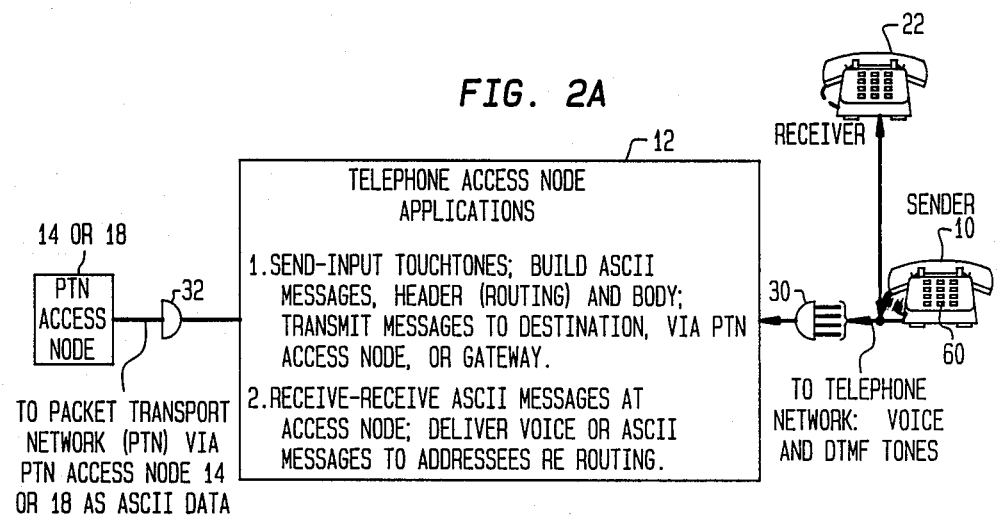

PACKET NETWORK TELECOMMUNICATION SYSTEM HAVING ACCESS NODES WITH WORD GUESSING CAPABILITY

BACKGROUND OF THE INVENTION

1. Field of the Invention

The invention relates to a telecommunication system in which the sender types a word on the DTMF keypad, the system determines the identity of the word and, once the word is identified transmits the information in ASCII digital format on a packet transport network to a location near the receiver where it is converted into speech.

2. Description of Related Art

The prior art discloses some systems for using a DTMF keypad to transmit messages to a remote location where a speech synthesizer reproduces a word. Typical of such systems is the invention described in U.S. Pat. No. 4,307,266 entitled COMMUNICATION APPARATUS FOR THE HANDICAPPED. According to that invention a sender enters the appropriate position for the letter of the alphabet to be communicated. A second entry identifies which one of the plurality of letters is intended to be transmitted. The sending party has apparatus attached to the telephone set which decodes the two digit code entry and converts the two-digit code to a standard machine readable format which can be displayed on a standard output device such as an alphanumeric display or, for blind persons, a braille or similar output message. The sending party can transmit the message to the receiving party, by keying characters into a keyboard. Keyed-in characters are converted to speech by a speech synthesizer for transmission to the receiving party. In other words, the sender types in the word in DTMF code and the resultant is reproduced at the receiving station by synthesized voice. While the foregoing system may be useful for certain applications, it seems to be rather cumbersome, limited in its vocabulary, and relatively inefficient in its transmission mode.

Other patents that discuss use of DTMF codes for transmission purposes include U.S. Pat. Nos. 4,087,638; 4,427,848 and 4,608,460.

Some attempts have been made in the prior art to identify a word from a DTMF dial tone clue. A useful description of such techniques is found in an article entitled "Digital Techniques for Computer Voice Response: Implementations and Applications", Lawrence R. Rabiner, Fellow IEEE and Ronald W. Schafer, Senior Member, IEEE PROCEEDINGS OF THE IEEE, Volume 64, No. 4, April 1976.

Of more general interest is an article entitled "Alphabetic Data Entry Via the Touch-Tone Pad: A Comment", Sidney L. Smith and Nancy C. Goodwin, The Mitre Corporation, HUMAN FACTORS, 1971, 13(2) Page 189-190.

Of general interest also are the following items from the patent literature: U.S. Pat. Nos. 3,778,553; 3,967,273; 4,012,599; 4,191,854; 4,426,555; 4,532,378; 4,577,062; 4,585,908; 4,608,457 and 4,633,041 as well as the following British Patents: 1,320,895 and 1,320,896.

Whether taken individually or as a whole, none of the prior art appears to suggest the novel apparatus and method set forth in this disclosure for efficiently identifying a word typed on a DTMF keyboard and converting that word into ASCII digital format so that it can be efficiently transported via a packet transport network to a remote location where it is converted from data to speech.

SUMMARY OF THE INVENTION

Briefly described, the invention comprises a telecommunication system which can guess at and identify words typed on a DTMF multi-button pad, convert the words into ASCII digital format, and transmit that information on a packet transport network to a remote location where the message is converted into speech. It is not necessary for the sender or receiver to have special equipment on their telephones since all of the functions are carried out at telephone access nodes (also referred to herein as a TAN) remote from the sender and receiver. Each telephone access node is capable of communicating with both the telephone network and a packet transport network, and also acts as a prompter, speaker and word guessing dictionary. The dictionary function comprises a memory data bank in which words are stored according to their length, their numeric equivalents and their relative frequencies. The memory may also store a unique 2 or 3 byte serial number which represents the guessed word and may be used in place of a full ASCII digital word. The prompter listens to the DTMF input of the sender and guesses the intended word based upon the number of digits and their composition, e.g. 3-843 probably means THE. At the end of each word the sender pushes the pound sign (#). The speaker relays to the sender the guesses selected by the prompter. The first push of # means "END OF WORD". When replying to a guess chosen by the prompter and spoken by the speaker, the # means "WRONG GUESS TRY AGAIN". This is intuitively appealing because the sequence of two or more spaces is usually redundant. After all of the words of the message are completed, the entrance access node converts each word into ASCII code or into a unique two or three byte serial number which may be encrypted. It is possible to convert most (about 8,000) common words into two byte serial numbers and some awkward, uncommon words into no more than three byte serial numbers. The foregoing information is transmitted through a packet transport network access node (PTN access node) via a packet transport network (PTN) to a receiving PTN access node and an egress telephone access node near the receiver. Using an identical dictionary, the egress TAN access node converts the ASCII coded word or two or three byte serial number into speech so that it can be heard by the receiver.

The foregoing system is capable of very rapid transmission rates and major efficiencies compared to the prior art. Speed is significantly increased because of the ability of the system to anticipate and identify quickly words which the sender wishes to transmit. In addition, transmission of ASCII coded words by a packet transport network is expected to produce compression ratios of 2,000 to one or more over conventional digitized voice systems. Use of two or three byte serial numbers can increase the compression ratios to 4,000 to one or more.

The foregoing invention can be further understood by reference to the following drawings.

BRIEF DESCRIPTION OF THE DRAWINGS

FIG. 2A is a general block diagram of a typical telephone access node.

DETAILED DESCRIPTION OF THE PREFERRED EMBODIMENT

During the course of this description like numbers will be used to identify like elements according to the different figures illustrating the invention.

Figure 1:
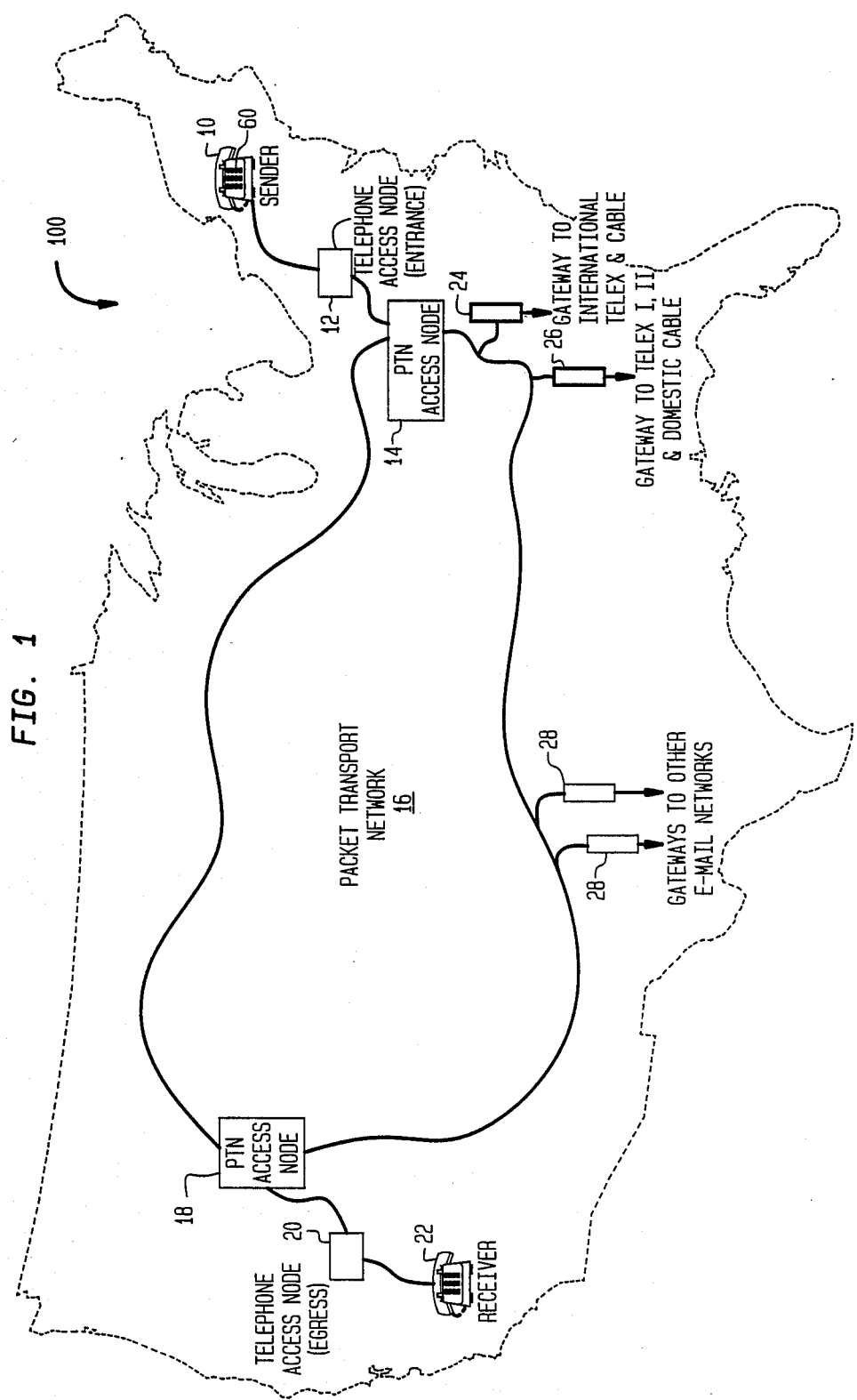
FIG. 1 illustrates the preferred embodiment of the telecommunication system according to the present invention in which two telephone access nodes are used to route a message over a packet transport network from a sender to a receiver.

FIG. 1 is a general schematic diagram of the preferred embodiment of the invention 100 showing how a message can be sent from a sender 10 in the northeastern United States to a receiver 22 in the southwestern United States. The message will be delivered by synthetic voice via an ordinary telephone. FIG. 1 also illustrates potential alternative routing via gateways 24, 26 and 28 to destinations anywhere in the world and via a variety of different delivery modes including Telex, cable and electronic mail.

Initially it is assumed that the sender 10 knows the telephone number of the nearest telephone access node 12 to him or her referred to herein as an entrance telephone access node. Entrance telephone access node 12 is connected by one or more concentrator lines to a nearby packet transport network access node (PTN access node) 14 which in turn is connected to a PTN (packet transport network) 16. The telephone access nodes 12 and 20, in addition to their PTN connections are also connected to telephone networks associated with the sender 10 or receiver 22 or both. Each telephone access node 12 or 20 preferably includes multiple connections to the telephone networks so as to be capable of conducting many dialogues simultaneously. The entrance telephone access node 12 functions to provide both entrance and egress to and from PTN 16 via PTN access node 14. Node 12 is labeled "entrance" in FIG. 1 and node 20 is labeled "egress" because that is the function that they perform for the purpose of illustrating the invention 100. However, it will be understood that both nodes 12 and 20 are identical to each other and, their roles could be easily reversed if it was desired to send a message from receiver 22 to sender 10.

The caller or sender 10 initially dials up the closest telephone access node using the DTMF buttons 60 on his or her telephone instrument and the entrance telephone access node 12 will respond to the call. Telephone access node 12 then conducts a dialogue with the sender 10 concerning the preferred routing of the call. In this manner the sender 10 interacting with the entrance telephone access node 12 determines the preferred delivery node of the message. The delivery may be by synthetic voice through a telephone, Telex I, Telex II, foreign or domestic cable, or by electronic mail (E-Mail). This is possible because the entrance telephone access node 12 includes routing tables 46 which can route via multiple gateways 24, 26 and 28 and via multiple delivery modes.

If the receiver 22 has a Telex I or II, the access node 12 requests the sender 10 to enter the Telex number and optional answer back. Then, this part of the initial dialogue is completed. If the delivery is to be via voice over the telephone, the entrance telephone access node 12 asks the telephone number of the receiver 22. The telephone number may represent a voice telephone instrument or a computer equipped with a modem if the delivery mode is dial-up E-mail. The E-mail option can also be accomplished by soliciting the network membership and mail box identification number of the receiver 22.

The dialogue can be further continued to request from the sender, requiring only "Yes" or "No" answers, his or her preference for options such as proof of delivery or other additional parties that he or she wants to receive the message. If additional parties are to receive the message, then the entrance telephone access node 12 will request additional Telex or telephone numbers.

The foregoing discussion assumes Telex routing is made possible by gateways 24 and 26 between the packet transport network and the Telex network. Therefore, this discussion concentrates on routing to the receiver 22 with a telephone through the use of synthetic voice.

If the sender 10 enters a choice for a voice message as the receiver's 22 message delivery mode. the entrance access node 12 will examine a table to determine the PTN access node 18 nearest to the egress telephone access node 20 serving that telephone number. The table is composed of telephone number NPA-NNX'S and their associated latitude-longitude. Given this table and the listing of all of the access nodes in the system 100, the entrance telephone access node 12 will determine the PTN access node 18 which is closest to the receiver's telephone access node 20 which is in turn closest to the receiver's telephone number. According to FIG. 1, the selected PTN access node 18 is the closest to egress access node 20 which is closest to receiver 22.

The entrance access node 12, having selected PTN access node 18 as the exit PTN access node, will address all of the packets it creates to that PTN access node for referral to egress telephone access node 20. This completes the entrance telephone access node 12 routing procedure for transmission from a sender 10 to a receiver 22 in the United States in the case of message delivery by synthetic voice.

FIG. 2A is a block diagram of a typical telephone access node 12 which can function as either an entrance telephone access node 12 or an egress telephone access node 20. A typical telephone access node 12 or 20 has multiple connections 30 to a standard conventional telephone network so as to be able to conduct many conversations with senders 10 and receivers 22 simultaneously. The standard conventional telephone network is not illustrated or discussed in detail in this disclosure since it is well known to those of ordinary skill in the ar. The telephone access nodes 12 or 20 also include a data link 32 to PTN access node 14 which in turn connects with PTN 16.

In addition to its function of communicating with the standard telephone network and the PTN 16, the telephone access nodes 12 and 20 also discharge two general applications with respect to sending and receiving messages. These applications are described in greater detail in FIGS. 2B-2E and 3. The major functions supporting the sending and receiving applications are the prompter, speaker and dictionary functions. The prompter function "listens" to the DTMF tones sent by the sender 10 and guesses the meaning of the word entered by the sender 10. The speaker function relays to the sender 10 the guesses selected by the prompter function. The speaker function is performed in part by a conventional text-to-speech board which can read the alphabetic data in the dictionary and pronounce the words in digital speech by interpretation of the characters contained in memory. Devices of this description are manufactured by Digital Equipment Corp., Texas Instruments and Natural Micro Systems. Software for this function is provided by Berkeley Speech Technology and others. The dictionary function contains one to several hundred thousand English words from which the prompter function selects its guesses.

After completing the routing procedure, the entrance telephone access node 12 will invite the sender 10 to type his or her message on the DTMF telephone buttons. The basic procedure followed by the sender 10 is to type on the DTMF keyboard buttons 60 as if the letters were actually functional. The actual information transmitted by the sender's telephone to the telephone access node 12 is, of course, in the form of only one of twelve distinct tones per each button depression. The letters employed by the system are those commonly inscribed on the DTMF telephone buttons 60 with the exception that the letter Q is assigned to the 7 button (PQRS) and the letter Z is assigned to the 9 button (WXYZ). The letters Q and Z are usually not found on conventional telephone dials or DTMF buttons 60.

The pound sign (#) on the DTMF telephone buttons 60 represents, according to the preferred embodiment of the present invention 100, the space bar on a standard typewriter. Each time the sender's telephone transmits the tone combination for the # to the telephone access node 12, the telephone access node 12 will assume the sender 10 has finished typing a word. It will then guess the word and, using its speaker function, speak the word to the sender 10.

The prompter function has two clues which it uses to decipher a numeric string typed by the sender 10 into an alphabetic word, namely the number of digits and the number combination.

Initially, assume that the sender 10 types THE which the entrance telephone access node 12 receives as 843. The sender 10 then types the # after the E, thus terminating the word and the prompter function will be in receipt of the string 843#. The prompter function contains a complete dictionary of the English language in its random access memory. The sequence of the dictionary entries is by (1) number of digits in the word (word size) (2) string definition being the numeric equivalent of the alphabetic word emitted by typing on a DTMF pad, e.g. 843 for THE, and (3) possible meanings of the string sequenced by probability of use. According to the former example, the prompter function will contain an entry of word size 3 digits, the string 843, and, e.g. the words THE, TIE, and VIE which represent the three possible interpretations of the string 843 listed in the order of their frequency of use in the English language. The dictionary contains a list of words corresponding to each numeric combination (e.g., 843). The choice of words is based on their frequency and words will be carried in the dictionary until it is calculated that their frequency is below some predetermined threshold. This threshold is definable in expected occurrences per million words of text.

An acceptable source of words and their frequency is the AMERICAN HERITAGE WORD FREQUENCY BOOK by Carroll, Davies, and Richman published by Houghton Mifflin Company. The foregoing book deals with frequencies encountered in eight million words of text.

According to the previous example, the most frequent interpretation expected of the string 843 is THE. The entrance telephone access node 12, using the speaker function, will speak the word THE to the sender 10. If THE is the correct interpretation for 843, the sender 10 will proceed to type the next word. If THE is not the correct interpretation for 843, the sender 10 will deny the guess by typing another #. The speaker 48 will then speak the next most likely word, in this example, TIE. If the sender 10 denies TIE by typing another # sign, the speaker 48 will speak VIE. If the sender 10 denies VIE, then the access node will announce to the sender 10 that it is shifting modes and ask the sender 10 to enter the word one letter at a time. Entering a word one letter at a time is the equivalent of entering a one letter word. The entrance telephone access node 12 will assume a # after each letter and speak a letter instead of a word to the sender 10. The sender 10 replies the same way—by entering a # if the guess is incorrect or else continuing with the next letter.

Given a particular numeric string such as 843, there are very few valid words that correspond to it. These valid words usually display widely divergent possibilities of use in English text. Therefore, guessing a word, given its size and numeric DTMF string, has been discovered to be an efficient and practical method for identifying words.

The dictionary function can be easily contained in the conventional equipment manufactured for micro-computers. An uncompressed dictionary of some 300,000 words can be contained in a memory board of 3 million bytes. In practice, some compression would be used, at a minimum to represent multiple forms of a verb in a single entry. For example, the word WALK, would represent walker, walking, walked, etc. Compression is useful because it minimizes computer memory. As the compression increases, the amount of memory will decrease but the response time will increase. The cost of RAM memory has become sufficiently low so that it may be preferable to minimize or eliminate the compression so as to maximize response performance and minimize software effort.

When entering a single letter at a time, the access node 12 (or 20) will guess the intended letter or number according to the frequency expected of the 4 or 5 possible meanings of a single DTMF button. For example, if the caller 10 enters the number 8, the telephone access node's 12 first guess will be the letter T. If the caller 10 denies the T, then the next guess will be the letter U. If the caller denies the U, the next guess will be the letter V. If the caller 10 denies the V, then the next guess will be the number 8. If the 8 is not denied, (it is the last possibility for the 8 button), the access node 12 will assume that the caller is entering numeric data and subsequently respond to single letter entries with numbers instead of letters.

When the prompter function successfully interacts with the caller 10 with the proper guess, the prompter function stores the correct interpretation of the DTMF input in a special area of the telephone access node memory assigned to contain the message in the process of being built. Therefore, when the sender 10 signals that he has finished inputting his or her message, the telephone access node 12 will connect to an assigned PTN access node 14 and send the message in an ordinary format undistinguishable to the PTN access node 14 from that as would be received from a normal data terminating equipment data source such as a microcomputer. The message is also routed to the preselected PTN access node 14 of the PTN 16. The memory area allocated to receive the message in the process of building in the access node is maintained as a scratch pad for the duration of the session. When the prompter function needs to guess a word, it will refer first to the scratch pad to see if a particular numeric string has been used previously in the current session. If so, the prompter will make its first guess according to the previous interpretation of a given numeric string.

With respect to the DTMF keyboard buttons, it has been found that the twelve buttons can be made to represent any arbitrary number of different characters. This is accomplished by designating one button, in this case the *, as the mode shift button. An analogy can be seen between the use of the * button to mean "mode shift" in this system and the presence of the Figs/Lets key on a Telex board as also meaning "mode shift". In the case of Telex, there are only two modes-Figures or Letters. If desired, the system can be expanded to include any number of modes. The caller 10 can demand a mode shift by pressing the * button or the telephone access node 12 can decide to shift the mode when it realizes that it would be convenient or necessary. An example of the mode shift called for by the access node is found when the telephone access node realizes that the caller 10 is entering numeric data instead of letters. The access node 12 will announce the mode shift to the caller 10 in such a case.

After the complete message is assembled, it will be transmitted to PTN access node 14 and then transmitted over PTN 16 to the destination PTN access node 18. The PTN access node 18 will then transmit the message to the egress telephone access node 20. The egress telephone access node 20 will examine the routing accompanying the message and select the delivery method specified by the caller 10. According to the present example (a voice call) the egress telephone access node 20 will make a telephone call to the receiver 22. At this point, when the egress telephone access node 20 recognizes that the receivers phone 22 has gone off-hook, the egress telephone access node 20 will deliver the message using the synthetic voice function of the Speaker subsystem.

Figure 2B:
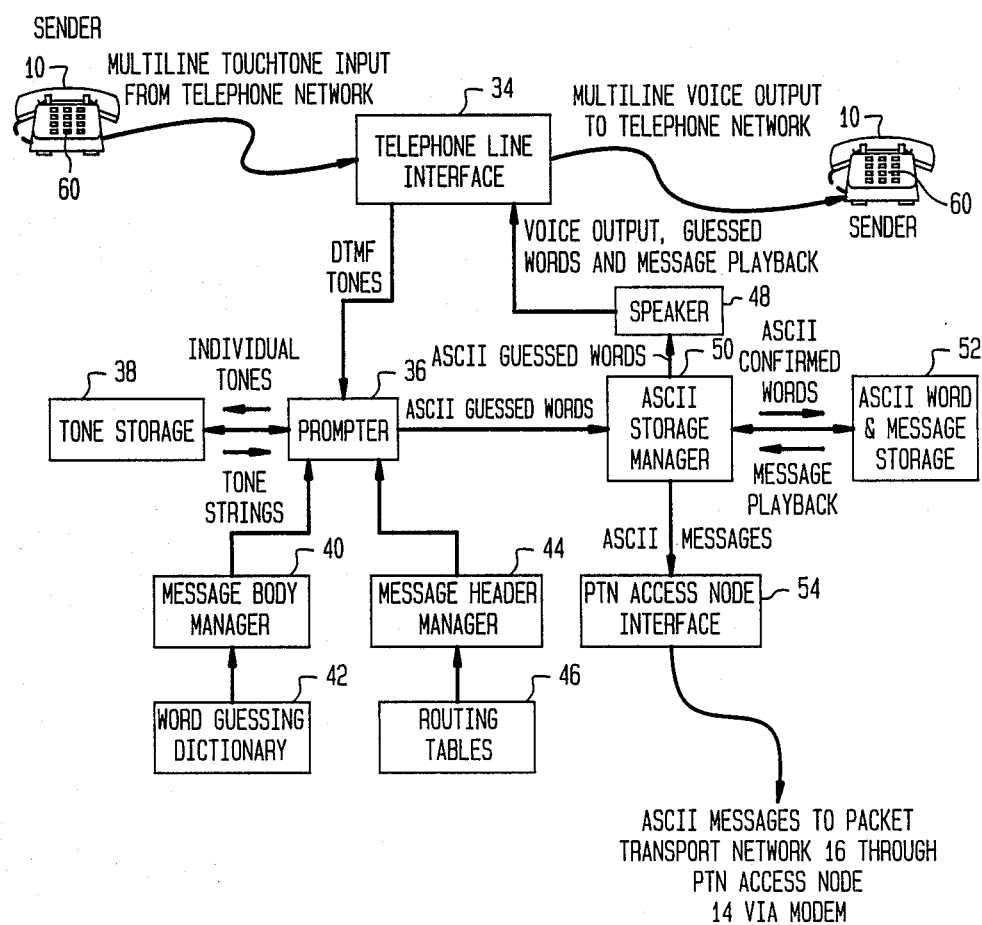
FIG. 2B is a detailed schematic illustration of the telephone access node illustrated in FIG. 2A shown in the context of its SEND application.

The send mode of the telephone entrance access node 12 is illustrated in FIG. 2B which indicates the interrelationship of the several functions executed by the SEND application.

A standard telephone line interface 34 responds to dial up instructions from the sender or senders 10. It goes off-hook and conducts a dialogue with the caller to create an ASCII message using DTMF tones as input.

The messages are composed of two sections—a header and a body. The header is created first by asking questions of the caller 10 which are answered by Yes (Y) or No (N) or by entering information on the numeric keys. According to the present example, the message is assumed to be intended for delivery by synthetic voice to the recipient's telephone so the primary data requested by the system is the recipient's telephone number.

The prompter 36 together with the message header manager 44 solicits the header input which arrives one tone at a time and is saved in the tone storage 38 by the prompter 36. The individual tones are appended into strings. When the strings are completed, the prompter 36 compares them with valid data supplied by the routing tables 46 such as valid area codes. When the recipient's telephone number is completely entered, the routing table 46 supplies the identification of the PTN 16 access node to which the message will be addressed. The PTN node address is a function of the routing table 46 which supplies the network node address as a function of the argument of area code and central office code, which are the first six digits of the recipient's telephone number.

After completing the input of the header, the prompter 36 solicits the sender 10 to enter the body of the message. Words are entered using the DTMF keyboard buttons as if the letters inscribed on the buttons were actually functional. For example, to enter the letters A or B or C, the sender presses the 2 button. The prompter 36 examines each entered tone to determine whether it is a # digit. The # digit in this context is analogous to a space in ordinary text—that is, it means the end of the word. If the newly entered digit is not a #, the prompter 36 appends it to the tail end of the current string of tone digits in tone storage 38. If it is a #, the string is terminated and the prompter 36 in cooperation with the message body manager 40 uses the string to guess the word intended by the caller. The complete string is retrieved from the tone storage 38 by the prompter 36 and the message body manager 40 uses the completed string to compare against the word guessing dictionary 42. The message body manager 40 supplies the guessed word to the prompter 36 which sends it to the ASCII storage manager 50. The ASCII storage manager 50 saves the word in the ASCII word and message storage 52 and also sends it to speaker 48. Speaker 48 translates the ASCII word to spoken output using conventional text-to-speech hardware and software. The guessed word is thus spoken to the sender 10 who will either confirm or deny the guess.

The sender 10 will enter another # to deny the guess or continue entering the next word to confirm the guess. If the guess is denied, the prompter 36, message body manager 40, and word guessing dictionary 42 will supply another guess if there is another one available in the word guessing dictionary 42. If there are no more words in the word guessing dictionary 42 which are appropriate to the DTMF tone string, then the prompter 36 will announce to the caller 10 that the word guessing has failed and the prompter 36 changes modes so as to guess a single letter at a time instead of a whole word at a time. Guessing a single letter at a time is the same as guessing a one letter word.

If the guess is confirmed, the guessed word has been stored in the ASCII word and message storage unit 52 by the ASCII storage manager 50 replacing any previous words which were guessed incorrectly. The guessed words are stored in the sequence of their entry separated by spaces. Thus the ASCII message is built up one word at a time.

Figure 2C:
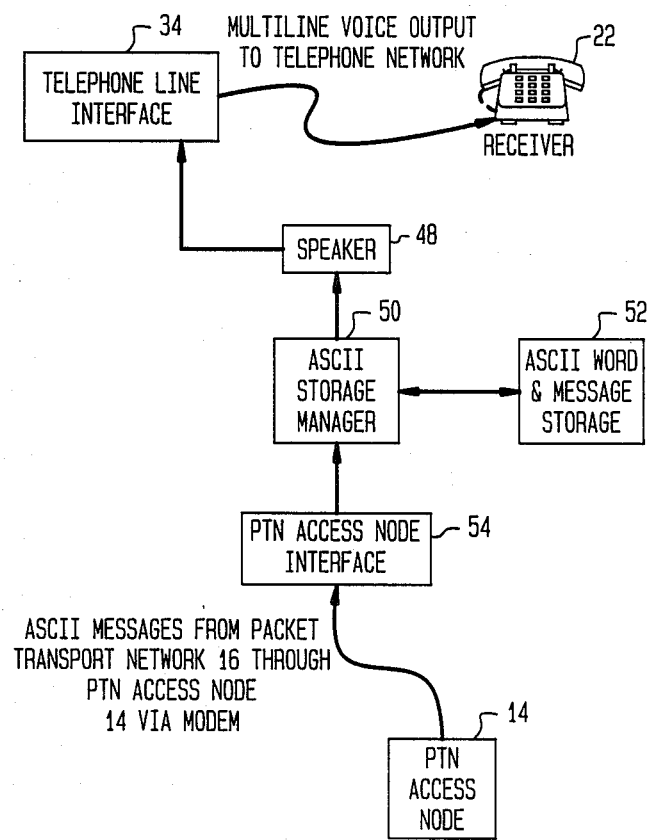
FIG. 2C is a detailed schematic illustration of the telephone access node illustrated in FIG. 2A shown in the context of its RECEIVE application.

FIG. 2C is a schematic diagram of the receive application showing the interrelationship of the several functional units which operate during the receive application. This is the application performed by egress telephone access node 20 illustrated in FIG. 1.

The PTN access node interface 54 is employed in both the send and receive applications. As shown in FIG. 1 and in FIG. 2C, PTN access node interface 54 receives input from the PTN access node 18 connected to the PTN 16. When PTN access node interface 54 receives input from PTN access node 14 or 18, the packets have been assembled into message formats. PTN access node interface 54 then delivers the completed messages to the ASCII storage manager 50. A single high speed modem such as a U.S. Robotics Courier 9600 Baud modem is sufficient to serve the traffic interchange between a telephone access node 12 or 20 and its neighboring PTN access node 14 or 18 respectively. A single modem will carry data traffic equivalent to the DTMF traffic of many voice connections. The best choice of an interface to a PTN access node 14 or 18 will be made by requesting the PTN to specify the equipment best suited to interface with theirs.

The ASCII storage manager 50 deposits the completed inbound messages into the ASCII word and message storage 52 to await delivery by the speaker 48. The ASCII storage manager 50 and the word and message storage unit 52 functions are preferably, but not necessarily, implemented in conventional software. The ASCII word and message storage 52 also preferably includes a large 3 megabyte RAM.

The speaker 48 discharges the function of dialing out to the receiver 22. The receiver's telephone number is contained in the message header. When the telephone line interface 34 detects that the receiver's telephone has gone off-hook, it retrieves the message from storage 52 and delivers the audio conversion of the ASCII text to the receiver 22 through the telephone line interface 34. There are preferably several lines interfacing the access node 12 or 20 to the conventional telephone network so that many messages may be delivered simultaneously.

Figure 2D:
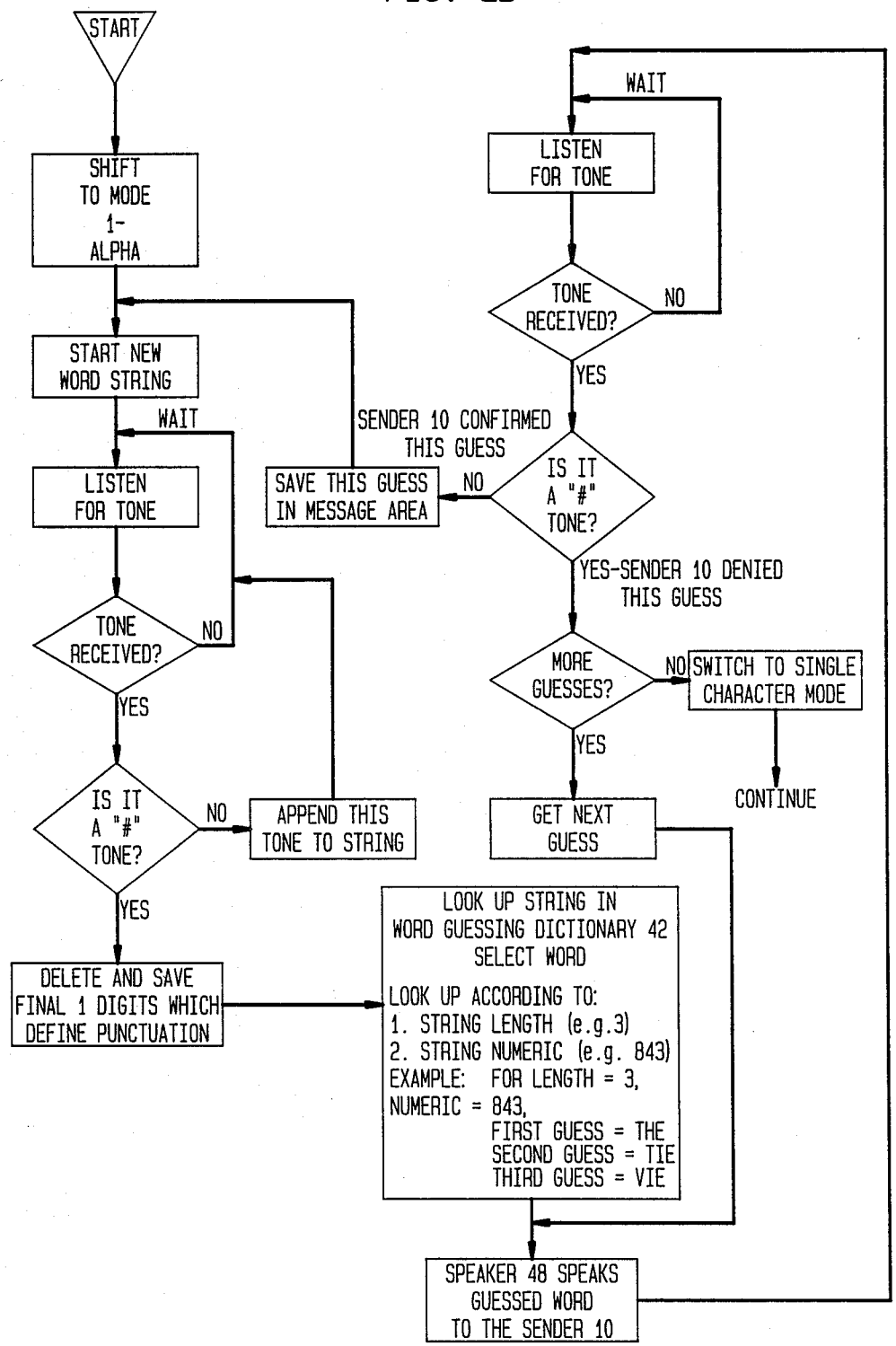
FIG. 2D is a process chart illustrating the interactions between a sender and the prompter function while assembling a message on a telephone access node such as shown in FIG. 2A.

FIG. 2D diagrams the building of a string of tones one string at a time. When the # button is depressed, the prompter 36 senses that the string is complete. Then it takes the complete string and looks it up in the word guessing dictionary 46. Using the look up function, to find words corresponding to the string of tones, the system 100 guesses the words according to their probability for that particular string of tones, and passes them to the speaker 48 for output to sender 10. The sender 10 either denies the guess by pressing another # or accepts the guessed word by continuing with typing the next word, that is, by pressing any button but the # button.

The correctly guessed words are appended to the current string of correctly guessed words and in this way, a complete message is constructed one word at a time.

Figure 2E:
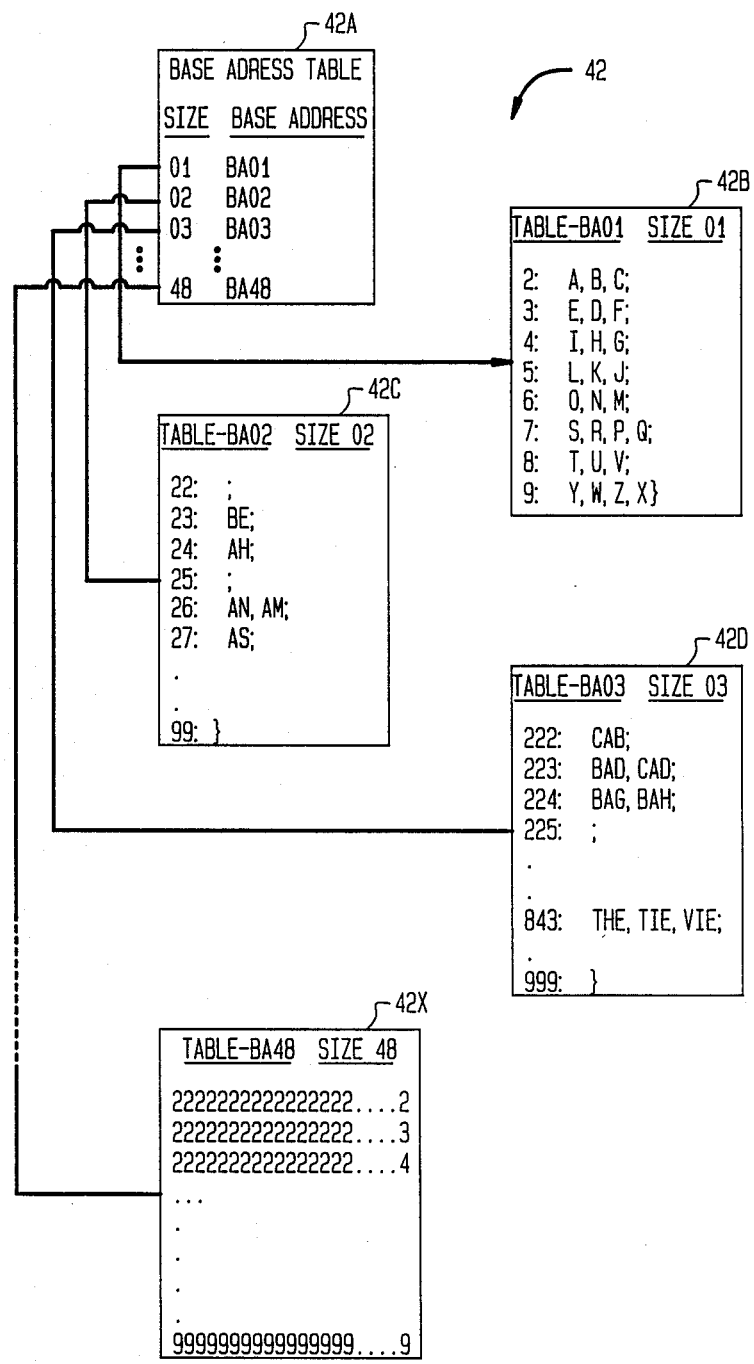
FIG. 2E is a schematic diagram illustrating the memory organization of the word guessing dictionary of the access node illustrated in FIG. 2A.

The word guessing dictionary 42 is illustrated schematically in detail in FIG. 2E. Word guessing dictionary 42 is employed by the look up function diagrammed in FIG. 2D to translate from DTMF strings to ASCII words. The input for the look up function is a string of DTMF digits. The output of the look up function is an ASCII word or words. The look up function is invoked by the prompter 36 when the prompter 36 senses that the sender 10 has entered a # digit. This is the equivalent of a space bar on a typewriter. The acceptable digits used as input to the look up function are 2 through 9. These digits represent the twenty-six letters of the alphabet. The correspondence between the DTMF digits and the 26 letters is exactly that inscribed on an ordinary DTMF keyboard button pad with the exception that the letter Q is assigned to the 7 digit and the letter Z is assigned to the 9 digit.

FIG. 2E is essentially a map of the layout of the word guessing dictionary 42 and a scheme for processing a string of DTMF tone digits to produce a guessed ASCII word. The guessed word is sent to the speaker 48 which produces an audio output to the sender 10.

The map of FIG. 2E proposes the ability of the look up function to find and guess words of size 2 as shown in Table 42C to size 48 characters as shown in Table 42X. In practice, most number combinations such as 22 have no words at all which correspond to them.

The first task of the look up function is to remove trailing "one" digits which in this invention designate punctuation. Then the number of digits less the trailing punctuation and the terminating # are counted. Then the look up function searches the base address table 42a to find the base address of the table for the word of the string size just counted. In the example used herein with regard to the word THE, the string is taken to be 843 which in the map diagram of FIG. 2E will be found in the size 03 table 42d being at address BAO3.

The conventions used in FIG. 2E to describe the word guessing dictionary 42 organization are meant to be illustrative and not necessarily efficient. In practice, the implementation of the invention would concentrate on the fact that most numeric strings have no such words at all which correspond to them. The colon (:) is used here to separate the arguments such as 843 from the first guessed word. The comma (,) is used here to separate the successive word entries for a given numeric string in the dictionary 42. The semicolon (;) is used here to terminate all the words for a given numeric string, e.g., 843. The right curly bracket (}) is used here to terminate all the entries for strings of a given size, e.g., 3 digits. There is no terminator for the whole dictionary as each table is independent of all the others.

A feasible, if somewhat inefficient method of finding the THE in response to an 843 string is to (1) find the base address of the size 03 table in the base address table 42a (this address is shown as BA03); (2) search table BA03 for colons; and (3) inspect the 3 digit number preceding each colon until the string 843 is encountered. Then, the right side of the colon will have acceptable word guesses for the string 843 in the sequence of their probability. The actual probability of a word does not necessarily appear in the tables of the word guessing dictionary 42 illustrated in FIG. 2E. It is present only by the implication of the sequence of the word within a given n digit numeric entry. The sequence of the words within a given n digit numeric entry implies the relative, though not absolute, frequency of the word. Each word in turn, will be retrieved and sent to the speaker 48 for audio output to the caller 10. The caller 10 will accept or reject the guessed words. If the caller rejects VIE, the last word in the table for 843, then the system will shift to single letter mode and will announce the shift to the sender 10.

The single letter mode is equivalent of guessing one digit strings. The size 01 table 42b at address BAO1 is shown in FIG. 2e. Note that the 26 letters of the alphabet are contained in the size 01 table 42b in the sequence of their probability within a given numeric digit.

Figure 3:
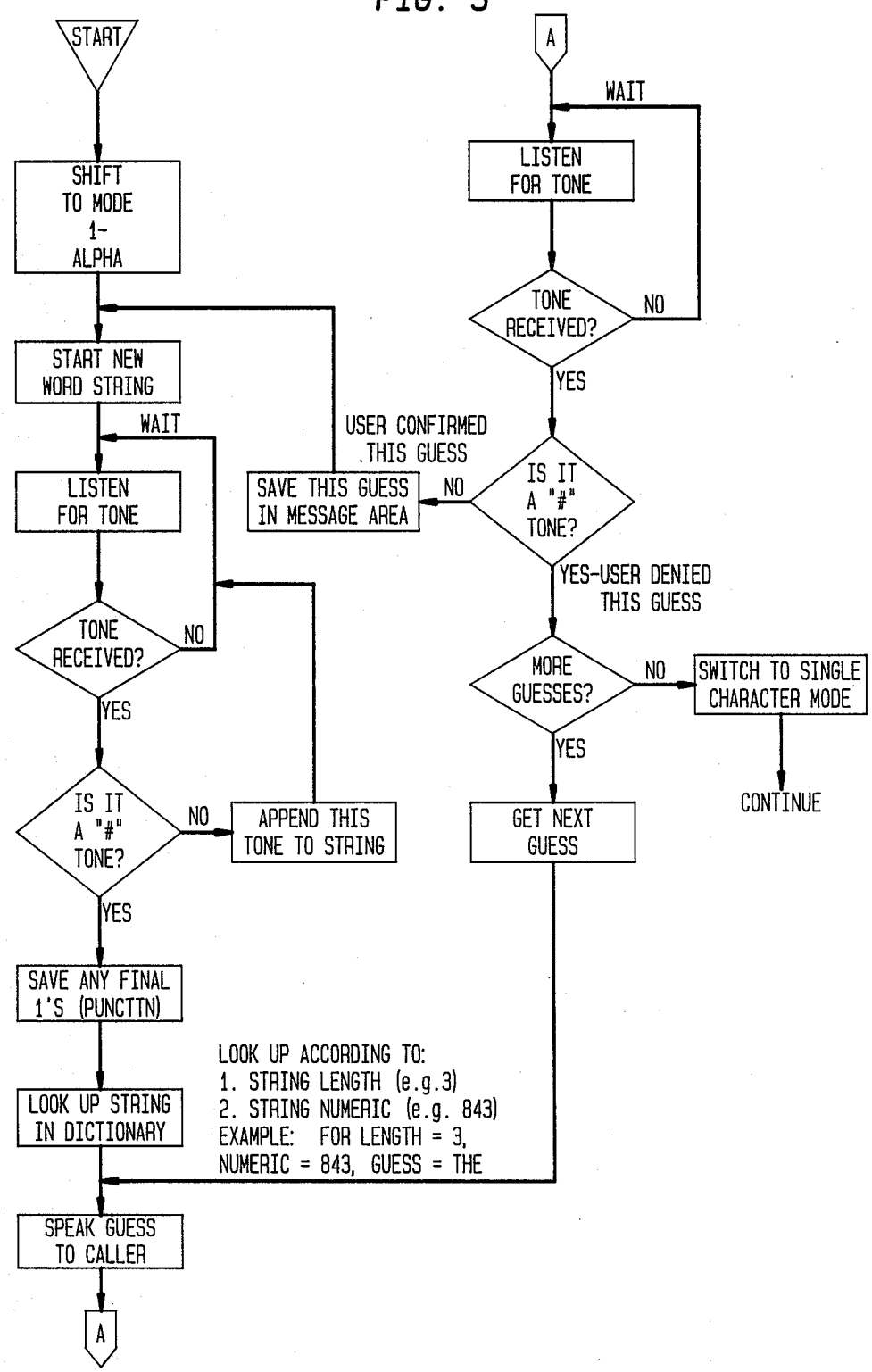
FIG. 3 is a table showing the four different modes that can be invoked using a standard DTMF multi-button pad.

FIG. 3 discloses the mode arrangement choices for the DTMF multi-button pad. As previously discussed, the DTMF keypad can be made to represent any number of different characters by a mode shift function analogous to the Figs/Lets key on a Telex keyboard. FIG. 3 is an exemplary table of such an arrangement having four modes. Users of the system 100 would be supplied with overlays fitting over the DTMF keypad buttons. The overlay, or template, would display the mode arrangement choices.

There is an implied mode not shown in FIG. 3 which is that used when entering a single letter at a time. In this case, the entry of for example, the 2 button would cause a guess of A, then B, then C which are the relative frequency of these three letters in the English text. As another example, the depression of the 7 button in a single letter mode would cause the prompter 36 to guess single letters in the sequence S, R, P and Q. If the sender 10 denied the Q, then the access node 12 assumes the number 7 and announces to the sender 10 that it is shifting to the numeric mode. Subsequently, all entries will be assumed to be numeric until the next mode shift.

In mode 1, the Alpha mode, the 1 button represents the word terminators in addition to the # which means a space bar. After guessing the word, the prompter 36 will proceed to guess the terminator. The terminators are arranged in approximate order of their frequency. The terminators are, in order: period(.), comma(,), question mark(?), colon(:), and semicolon (;). The zero (0) button is always the backspace key except in numeric mode. The asterisk (*) button is always the mode shift "UP" 1 button. The mode shift is always UP - 1, 2, 3, 4 followed by 1. The shift is cyclic. The mode shift key is always available from any mode. The sender 10 or the prompter 36 may shift modes. Whenever either the sender 10 or the prompter 36 shifts modes, the prompter 36 will announce the new mode. The # is always the terminator button.

There are many other clues but they do not appear to be necessary to implement in order to make the system 100 usable. For example, after a string of consonants when answering the letters one at a time, there will be a requirement to enter a vowel. This is a valuable tool that could be implemented for the prompter 36 but it is not necessary because of the fortunate arrangement of the letters on the buttons. Each vowel is on a different button and it is also the most likely guess for the letter on the button except for the vowel U which shares the 8 button with the T which appears more frequently in English text. The assumption is that the relative frequency of the appearance of letters in the English text is E T A O I N S H R D L U ... and so forth.

Note in Mode 3, the miscellaneous mode, that the symbols for add(+), subtract(−), multiply(x), divide(÷), dollar sign($), and equals(=) occupy individual buttons by themselves. Buttons 1 and 2 have a collection of symbols of low expected usage. Note that there is a # followed by the ampersand (&) symbol on the 2 button in Mode 3 which is not to be confused with the # button meaning space.

Special modes can be constructed for foreign languages. In addition, special tables can be constructed and saved on mass storage for closed user groups, i.e. a group of people or businesses with a particular set of communication requirements in common. For example, a national group of florists might have a special directory of numeric strings and their interpretation that might vary from that used by a casual user. For example, a special numeric string might identify a special arrangement of flowers to be delivered at a particular location. When the signon and password protocol is completed, system 100 will recognize the sender 10 password as belonging to a particular closed user group and call in the special Dictionary 40 to be used during that session.

It is anticipated that each sender 10 will have his or her own unique subscriber identification number and password in order to access the system 100 similar to the manner in which conventional data base systems are accessed.

TABLE OF ELEMENTS

1. Element: Telephone Line Interface 34

Function Receives DTMF input (tones) from the telephone network. Sends voice output to the telephone network.

Source: A telephone interface board such as a WATSON Board from Natural Microsystems, Natick, MA; a D41A board from Dialogic Corporation, Parsippany, NJ or a DECTALK from Digital Equipment Corporation Maynard, MA. Several of these boards are required per Telephone Access Node or there are boards such as the Dialogic D41A available with several telephone interfaces per board. Up to eight D41A boards each with four voice ports can be installed in one computer giving 32 simultaneous voice connections per computer. Not all telephone interface boards have text-to-speech capability. Examples are the WATSON and the D41A. The boards can play digitized speech but cannot convert ASCII text to audio. If either of these boards are used, then text-to-speech software is required. Such software is available from Berkeley Speech Technology, Berkeley, CA. The software can convert ASCII to digitized speech which then can be spoken by the boards.

2. Element: Tone Storage 38

Function: Receives and saves ASCII representation of DTMF tones. Receives one tone at a time. Appends each new tone to the current working string of tones. Outputs ASCII symbols representing the stored tone strings on a command from the prompter 36.

Source: Microcomputer and tone recognition software as in telephone line in Interface 34. A powerful 32 bit machine with multitasking software is employed to exchange messages with several senders and receivers simultaneously. Examples are an IBM PS/2 Model 80 from IBM Corporation, Poughkeepsie, NY, a COMPAQ Deskpro 386/20 from Compaq Computer Corporation of Houston, TX, or a PC's Limited 386/16 from PC's Limited of Austin, TX.

3. Element: Prompter 36

Function: Receives tone strings from tone storage 38 on command of the prompter 36. Interacts with message body manager 40 to search Word Guessing Dictionary 42 to extract word guesses in ASCII. Sends ASCII guessed words to the ASCII storage manager 50. Also interacts with the message header manager 44 to search the routing tables 46 for routing information in ASCII. Sends ASCII routing information to the ASCII storage manager 50.

Source: Microcomputer as in Tone Storage 38 and data base searching software.

4. Element: Message Body Manager 40

Function Receives tone strings from the prompter 36. Searches the word guessing dictionary 42 for corresponding words in ASCII. Sends guessed words to the prompter 36.

Source: Microcomputer as in Tone Storage 38 and data base searching software.

5 Element: Word Guessing Dictionary 42

Function: Approximately 100,000 dictionary entries consisting of tone strings and corresponding ASCII words stored according to their frequencies in a large (e.g., three million byte) memory board.

Source: Three million byte memory boards are available from AST Research, Inc. of Irvine, CA; Quadram Corporation of Norcross, GA; and Everex Corporation of Fremont, CA. A source of words and word frequency is The American Heritage Word Frequency Book published by Houghton Mifflin and Company.

6. Element: Message Header Manager 44

Function: Receives tone strings from the prompter 36. Searches the routing tables 46 for instructions to route message from sender to receiver.

Source: Microcomputer as in Tone Storage 38 and table searching Software.

7. Element: Routing Tables

Function: Stores routing data concerning: a. Telephone number versus their locations according to (modified) latitude and longitude. Source is the Local Exchange Routing Guide published by Bell Communications Research, Piscataway, NJ.

b. Gateways 28 to other E-Mail systems. Source is E-Mail system providers such as (e.g.) AT&T Mail, Basking Ridge, New Jersey; Compuserve, Columbus, Ohio; MCI Mail, Washington, D.C.; GTE Telenet; and Tymnet, McDonnell Douglas Network Systems Company.

c. Gateways to domestic 26 and international 24 Telex systems. Source is Consultative Committee on International Telephone and Telegraphy (CCITT), Geneva, Switzerland and Telex carriers such as (e.g.) Western Union, Saddle Brook, NJ; MCI Western Union International, Rye, NY; and ITT/RCA Globecom, New York, NY.

8 Element: Speaker 48

Function: A text-to-speech circuit board. It receives ASCII words from the ASCII storage manager 50 and delivers the corresponding audio to callers. The speaker element can probably be included in the telephone line interface element, however a telephone line interface does not necessarily include capability for text-to-speech conversion.

Source: Circuit boards with associated software having this capability are available from AT&T Conversant System,, Dayton, OH; Digital Equipment Corp. DECTALK, Maynard, MA; and Natural Microsystems Watson Board (hardware) Natick, MA, combined with software from Berkeley Speech Technology, Berkeley, CA (software).

9. Element: ASCII Storage Manager 50

Function: Receives guessed words and routing data from the prompter 36. Saves guessed words and routing data in the ASCII word & message storage 52 until messages are completed. Sends guessed words to the speaker 48 for playback to the sender. Also sends complete or partial messages to the caller for review. It saves confirmed guesses and erases incorrect word guesses from the storage. When a message is completed, the ASCII storage manager sends the ASCII message to the packet transport network interface on command of the sender. It also receives messages from a packet transport network and stores them in the ASCII word and message storage 52 while awaiting delivery to recipients.

Source: Microcomputer as in Tone Storage 38 and custom software.

10. Element: ASCII Word and Message Storage 52

Function: Stores ASCII words while they are in the process of message assembly. Stores ASCII messages while they are in the process of receipt or delivery. Multiple messages are in progress of receipt or delivery simultaneously.

Source: Extended memory board as in word guessing dictionary 42 and data storage and retrieval software.

11. Element: Packet Transport Network Interface 54

Function: A high speed modem. Exchanges (sends and receives) ASCII messages with the nearest packet transport network access node. In the United States, there are between 500 and 1000 dial up access modes available by a local telephone call. Most of these belong to GTE Telenet or McDonnell Douglas Tymnet. The provider of local access (GTE, Tymnet) is not necessarily the long haul packet hauler to the destination. The access modes have varying data rates of 300, 1200, and 2400 baud. The norm is 1200 baud. The message exchange may occur over digital communications lines so that a modem, as such, (performing modulation and demodulation) is not required. In this case, the message exchange is digital end-to-end. The interface is also expected to conduct data interchange with the Packet Transport Network so as to support billing to users.

Source: High speed modems are available from US Robotics, Skokie, IL; Hayes Microcomputer Products, Norcross, GA; and Universal Data Systems, Huntsville, AL. Also requires custom software for functions peculiar to this invention (e.g., billing) plus communications software usually supplied with modems.

While the invention has been described with reference to the preferred embodiment thereof it will be appreciated by those of ordinary skill in the art that modifications can be made to the parts and steps in the system without departing from the spirit and scope of the invention as a whole.

I claim:

1. A method of communicating information from a sender having a telephone with DTMF buttons to a remote receiver comprising the steps of:

spelling a word letter-by-letter by utilizing the DTMF buttons on the sender's telephone;

entering a signal on one of said DTMF buttons to indicate the end of the word;

comparing each word against an electronic memory which includes a dictionary of words by determining the number of letters in said word and comparing said word against words stored in said dictionary having the same number of letters, said words also being organized according to their relative frequency for any given combination of DTMF outputs;

feeding back to the sender a guess which corresponds to the word having the highest relative frequency for a predetermined word length and for a predetermined DTMF tone combination;

repeating said comparing step if a guess is rejected and feeding back to the sender another guess at the word corresponding to the same predetermined letter length and having the next most likely relative frequency;

automatically shifting from the word guessing mode to a letter-by-letter guessing mode if the dictionary runs out of the guesses for a word of a given predetermined letter length and a predetermined DTMF tone combination;

storing each word after it is correctly identified so that said words are assembled into a complete message prior to transmission;

transmitting said message as digital data over a packet transport network;

converting said data into speech; and, forwarding said speech to said remote receiver, wherein words in a message are entered by the sender and received as spoken words by the receiver at a remote location.

2. The method of claim 1 further comprising the steps of:

converting each word after it is correctly identified into a unique digital number prior to transmission over said packet transport network.

3. An access node apparatus for sending messages from a sender having a telephone with DTMF buttons connected to a conventional telephone network over a packet transport network to a receiver connected to another conventional telephone network, said access node comprising:

a telephone line interface connecting said access node to the telephone network of the sender;

a word guessing dictionary means for storing words first according to their letter length, second according to their DTMF tone number equivalents and third according to their relative frequencies;

a prompter means connected to said telephone line interface and to said word guessing dictionary means for accessing said word guessing dictionary means;

speaker means connected to said prompter means and to said telephone line interface for speaking the word guessed from said word guessing dictionary means to the sender;

mode shift means for automatically shifting the mode of said access node from a word guessing mode to a letter-by-letter guessing mode after the sender has exhausted all possible entries in the word guessing dictionary means for a word of a given letter length and for a given DTMF tone combination sequence; and, message storing means connected to said prompter means for storing words and assembling said words into a message prior to transmission as digital data over said packet transport network.

4. The apparatus of claim 3 further comprising:

header means connected to said prompter means for generating a routing header for each message, wherein said message header directs said message to the receiver.

5. The apparatus of claim 4 wherein said speaker means further includes:

text-to-speech synthesizing means for converting the digital data transmitted over the packet transport network into audible speech.

6. The apparatus of claim 5 further comprising:

packet transport network access means for connecting said access node to said packet transport network.

7. The apparatus of claim 6 further comprising:

tone storage means connected to said prompter for storing DTMF tones means.

* * * * *